Aug. 29, 1933.   W. H. HALL   1,924,189
LUBRICATING DEVICE FOR ANTIFRICTION SPINDLE BEARING
Filed Jan. 7, 1930
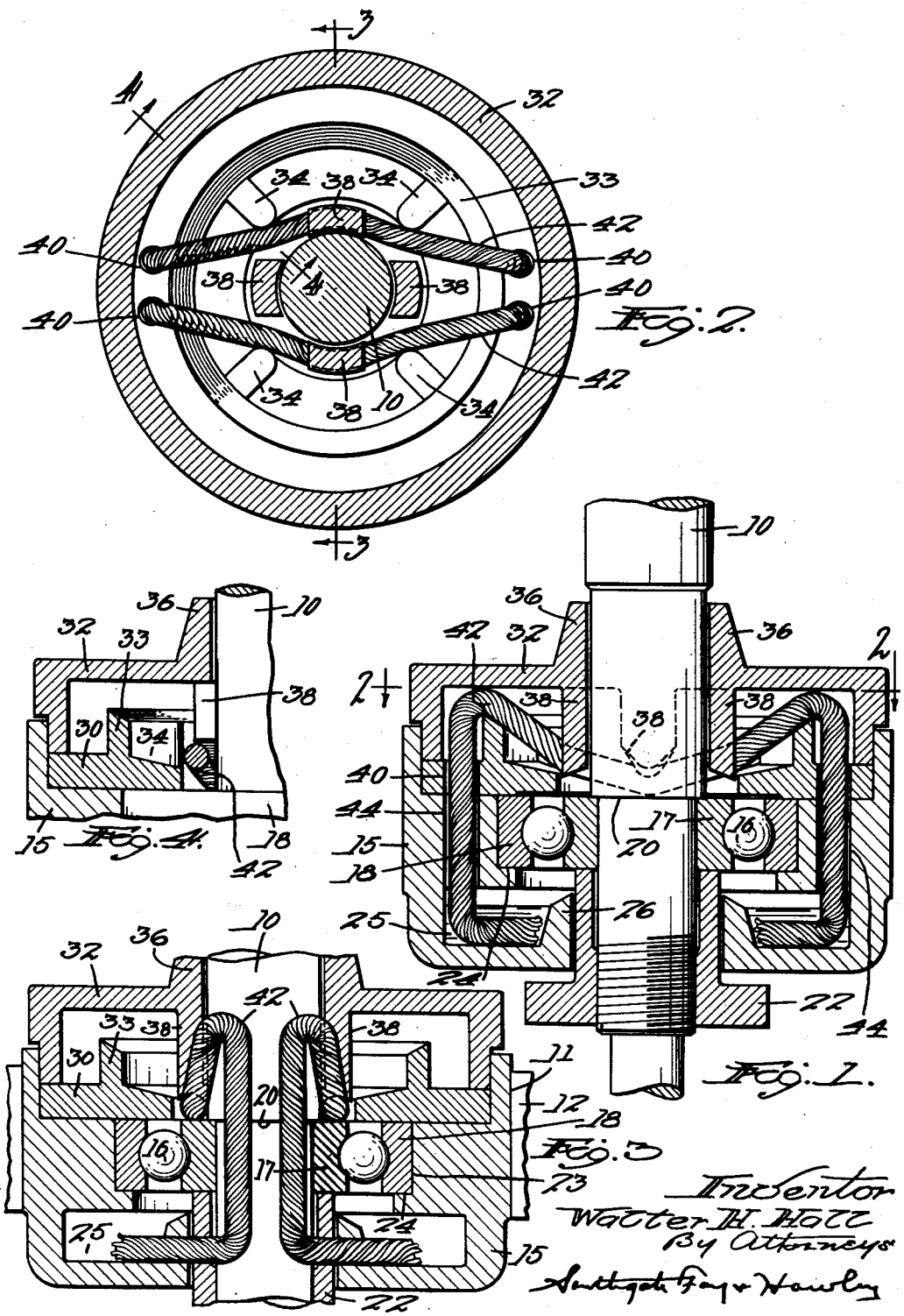
Inventor
Walter H. Hall
By Attorneys Patented Aug. 29, 1933

1,924,189

UNITED STATES PATENT OFFICE 1,924,189

LUBRICATING DEVICE FOR ANTIFRICTION SPINDLE BEARING

Walter H. Hall, Winchendon, Mass., assignor to Goodspeed Machine Company, Winchendon, Mass., a Corporation of Massachusetts Application January 7, 1930. Serial No. 419,176

2 Claims. (Cl. 308—187)

This invention relates to the lubrication of antifriction bearings, particularly when used on vertically disposed shafts or spindles. Such bearings are commonly of the ball or roller type and for continuous and satisfactory operation require effective lubrication. Only a small amount of oil is necessary but this small amount should be supplied regularly and preferably by a very slow but constant feed.

It is the object of my invention to provide an improved and simplified lubricating device for such antifriction bearings, by which the lubrication is most effectively and reliably performed.

My invention further relates to arrangements and combinations of parts which will be hereinafter described and more particularly pointed out in the appended claims.

A preferred form of the invention is shown in the drawing, in which

Fig. 1 is a sectional side elevation of a spindle bearing having my improved lubricating device applied thereto;

Fig. 2 is a sectional plan view, taken along the line 2—2 in Fig. 1;

Fig. 3 is a sectional elevation, taken along the line 3—3 in Fig. 2; and

Fig. 4 is a partial sectional side elevation, taken along the line 4—4 of Fig. 2.

Referring to the drawing, I have indicated a shaft or spindle 10 extending vertically through an opening 11 (Fig. 3) in a frame member 12. A casing 15 is secured in the opening 11 of the supporting frame member 12 and is disposed concentric with the shaft 10.

An anti-friction bearing, shown herein as of the ball type, is provided, the balls 16 of which are confined between an inner ball race 17 and an outer ball race 18. The inner ball race 17 fits snugly on the spindle 10 and at its upper face engages a shoulder 20 thereon. A nut 22 (Fig. 1) threaded on the spindle 10 engages the lower face of the inner ball race 17 and holds the same from axial movement on the spindle 10.

The outer ball race 18 is forced into a recess 23 in the casing 15 and is positioned vertically by a shoulder 24 therein. The lower portion of the casing 15 is chambered to provide an oil storage space 25 and is provided with an upwardly extending annular inner flange 26 to prevent the escape of oil therefrom.

A partition plate 30 is secured in the casing 15 by a cover 32 which fits snugly into the upper end of the casing 15 and holds the plate 30 from upward displacement. The plate 30 has an upwardly extending flange 33 substantially midway between its inner and outer edges, and spaced abutments 34 (Fig. 2) extend inward from the flange 30.

The cover 32 has a hub portion 36 loosely surrounding the spindle 10 and also has a plurality of projections 38 extending downward inside of the cover 32 and adjacent the spindle 10.

The partition plate 30 has openings 40 (Fig. 1) through which wick members 42 loosely extend. The casing 15 also has openings 44 aligned with the openings 40, through which the wick members 42 extend downward with their lower ends immersed in the oil in the recess 25.

Above the partition 30 the middle portions of the wick members 42 are forced inward against the periphery of the spindle 10 by the projections 34 previously described and the wick members are also forced downward by the projections 38 into direct engagement with the upper face of the inner ball race 17, as indicated in Fig. 3.

Having described the details of construction of my improved lubricating device, the method of operation and advantages thereof will be easily apparent. Oil is drawn upward from the recess 25 by the capillary action of the wick members 42 and is conducted to the middle portions of the wick members which are in direct contact with the periphery of the spindle 10 and more particularly with the upper face of the inner ball race 17. The upper face of the ball race is thus effectively lubricated and the lubricant is worked outward by centrifugal force to the opening between the inner and outer ball race and thus to the balls 16. The running parts of the anti-friction bearing are thus effectively lubricated and any surplus oil flows directly back to the oil recess 25.

Furthermore all parts of the bearing are effectively protected from dust and dirt and the device is thus particularly applicable to wood working tools such as rotary molders or shapers, in which dust and dirt are prevalent.

Having thus described my invention and the advantages thereof, I do not wish to be limited to the details herein disclosed, otherwise than as set forth in the claims, but what I claim is:—

1. A lubricating device for a spindle having an anti-friction bearing with inner and outer races, comprising a casing mounted in fixed position concentric with said spindle and having an oil storage recess below said bearing, a cover for said casing, and wick members having intermediate portions disposed within the upper part of said casing and having end portions extending downward to said oil recess, said casing having spaced inwardly projecting elements effective to position the intermediate portions of said wick members inwardly to increase their arc of contact with the periphery of said spindle, and said casing cover having depending projections effective to hold said intermediate portions in direct contact with the upper face of the inner bearing race.

2. A lubricating device for a spindle having an anti-friction bearing with inner and outer races, comprising a casing mounted in fixed position concentric with said spindle and having an oil storage recess below said bearing, a cover for said casing, and wick members having intermediate portions disposed within the upper part of said casing and having end portions extending downward to said oil recess, said casing having a partition with an annular upwardly extending flange disposed between the outer wall of the casing and the spindle and spaced therefrom, said partition also having elements projecting inwardly from said flange and effective to displace the intermediate portions of said wick members inwardly to increase their arc of contact with the periphery of said spindle.

WALTER H. HALL.